(No Model.)
H. HUEG.
CAKE MACHINE.
No. 534,106. Patented Feb. 12, 1895.
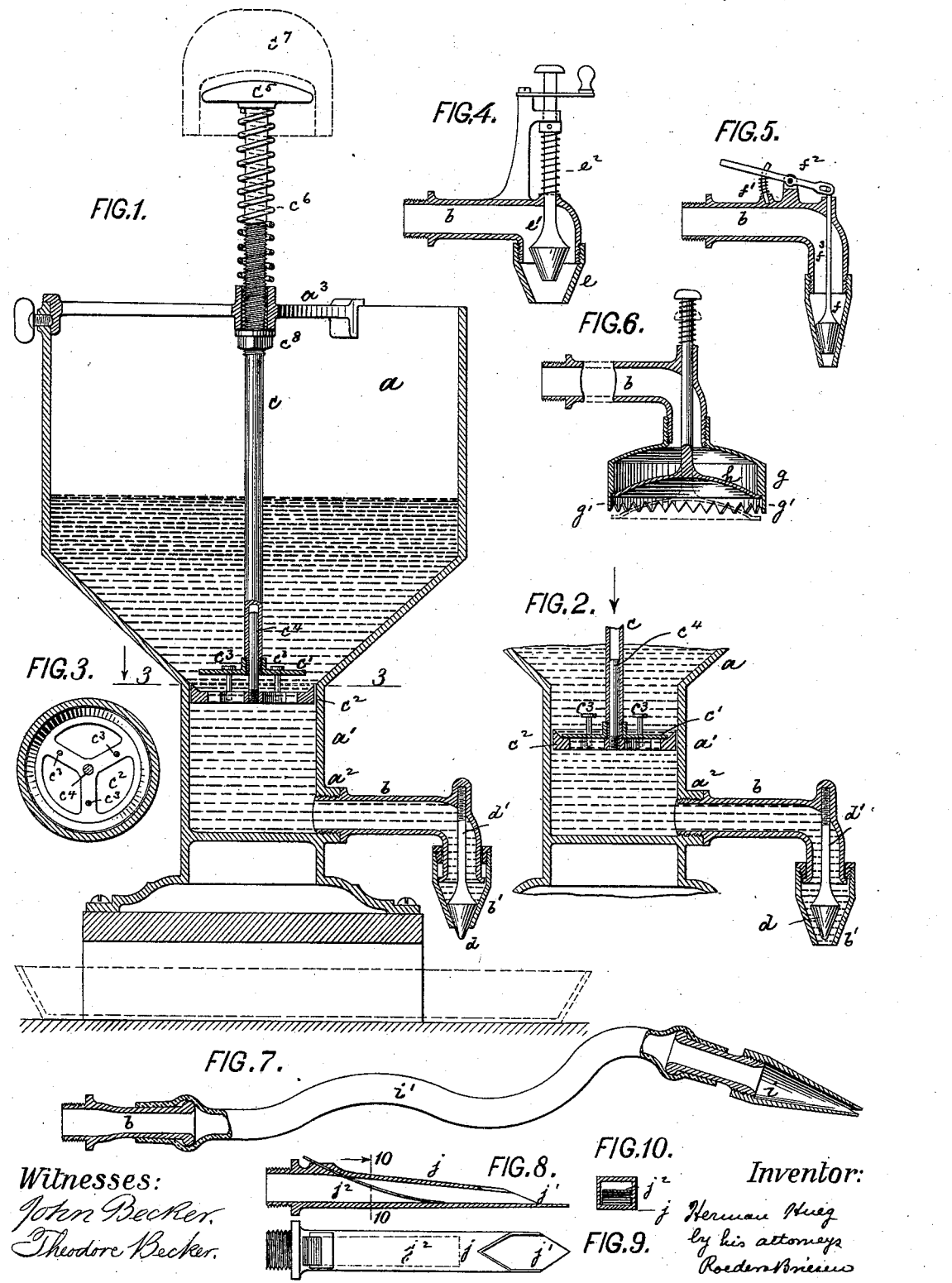
Witnesses:
John Becker.
Theodore Becker.
Inventor:
Herman Hueg
by his attorneys
Roeder Briesen

UNITED STATES PATENT OFFICE.

HERMAN HUEG, OF LONG ISLAND CITY, NEW YORK.

CAKE-MACHINE.

SPECIFICATION forming part of Letters Patent No. 534,106, dated February 12, 1895.

Application filed November 21, 1894. Serial No. 529,473. (No model.)

*To all whom it may concern:*

Be it known that I, HERMAN HUEG, of Long Island City, New York, have invented new and useful Improvements in Cake-Machines, of which the following is a specification.

This invention relates to an improved machine by which soft cakes may be filled, shaped or decorated in a simple manner and without the use of skilled labor.

In the accompanying drawings, Figure 1 is a vertical central section of my improved cake machine, showing the plunger at rest. Fig. 2 is a similar section through the lower end of the machine, showing the position of the parts during the descent of the plunger. Fig. 3 is a cross section on line 3, 3, Fig. 1. Figs. 4, 5, 6, 7 and 8 are longitudinal sections through various forms of nozzles. Fig. 9 is a plan of Fig. 8, and Fig. 10 a cross section on line 10, 10, Fig. 8.

The letter $a$, represents the hopper or body of my improved cake machine adapted for the reception of cream, jelly, dough, or other material to be formed or embodied into a cake or article of confectionery. The hopper $a$, is contracted at its lower end, as at $a'$, to form a cylindrical chamber having one or more nipples $a^2$, to which the discharge tube or tubes $b$ are removably attached. Within the hopper $a$, there is free to reciprocate a central tubular plunger $c$, provided at its lower end with a fixed disk or collar $c'$. To the lower end of the plunger $c$, there is furthermore secured an independently movable open head $c^2$, (Fig. 3,) that is connected to the collar $c'$, by headed guide pins $c^3$. These pins are rigidly connected to the head $c^2$, while they pass loosely through the collar $c'$, and thus the head is free to move toward and away from the collar. A stem $c^4$, projecting upwardly from the head $c^2$, and into the bore of the plunger $c$, serves to properly guide the head $c^2$, in its independent motion.

The upper end of the plunger $c$, passes through a spider $a^3$, and is surrounded beneath its knob $c^5$, by a coiled spring $c^6$, that has a tendency to raise the plunger. Upon the knob $c^5$, cup-shaped weights $c^7$, of different sizes may be supported, which, when applied, will contract the spring and force the plunger downward. In order to limit and regulate the throw of the plunger, it is provided with a stop nut $c^8$, that strikes the spider $a^3$, when in its uppermost position, and thus checks the further ascent of the plunger.

As thus far described, the machine operates as follows: The hopper is filled with cream, dough, or other material, which will flow through the open head $c^2$, and into the cylindrical extension $a'$. The plunger is then slowly depressed, either by the weight $c^7$, or by hand. This pressure will cause the disk $c'$, to come into direct contact with the upper side of the open head $c^2$, because the descent of the latter is checked by the resistance of the cream beneath it. In this way the disk $c'$, will close the openings of the head $c^2$, and the parts $c'$, $c^2$, will jointly constitute one solid piston head, that will force the cream out of the tube $b$. When the plunger has arrived at the end of its downstroke, it is released (or the weight $c^7$, is taken off) so that the spring $c^6$, is free to draw the plunger upward. During this motion, the disk $c'$, will be moved off the head $c^2$, and thus the openings in the latter will be exposed, and the cream will be free to enter the cylindrical extension $a'$. As a general result therefore, the cylindrical extension will be emptied during the downstroke, and filled during the upstroke of the plunger, in a simple and effective manner.

The particular kind of nozzle to be secured to the tube $b$, depends upon the particular kind of work to be performed by the machine. In Figs. 1 and 2, the tube $b$, has a downwardly turned discharge end surrounded by a vertically movable nozzle $b'$. This nozzle is of tapering shape and is adapted to be closed by a fixed valve $d$, the stem $d'$, of which is rigidly secured to the pipe $b$.

During the descent of the plunger $c$, the dough, &c., bears against the inner face of the movable nozzle $b'$, and draws the same down (Fig. 2), and away from the valve, while during the ascent of the plunger, the suction will again draw the nozzle $b'$, upward to close the same. Thus the nozzle is alternately opened and closed and is particularly adapted for laying out all kinds of soft cakes, macaroons, sponge biscuits, meringues, &c.

In Fig. 4, the nozzle $e$, is fixed and the valve $e'$, is movable. The valve is depressed by hand and raised by a recoil spring $e^2$. This nozzle is particularly adapted for laying out all kinds of drops and confectionery.

In Fig. 5, the valve $f$, is normally closed by spring $f'$, bearing against a hand lever $f^2$, that is connected to the valve stem $f^3$. This nozzle is used for making bonbons, chocolate centers, marshmallows and similar articles.

In Fig. 6, the nozzle $g$, is cup shaped and provided with a serrated edge $g'$. When the disk shaped plunger $h$, is lowered beneath the edge $g'$, the dough is free to escape laterally, so as to form all kinds of jumbles, stars, hearts, rings and similar forms.

In Fig. 7, a pointed nozzle $i$, is secured to the flexible hose $i'$, and is used for the ornamentation of cakes with icing.

In Figs. 8 to 10, the nozzle $j$, has a sharp V shaped cutting edge $j'$, which is forced into the body of the cake. The filling which is ejected into the nozzle, will raise a light retaining spring $j^2$, and be forced into the punctured cake.

It will be seen that with my machine cakes and confectionery can be readily laid out, decorated and filled in a very rapid, cleanly, uniform and economical manner, and without the employment of skilled labor.

What I claim is—

1. The combination of a hopper with a tubular plunger, a perforated independently movable head having a pin that engages the plunger, an imperforate disk secured to the plunger above the perforated head; a discharge tube, a nozzle secured thereto and a valve adapted to engage said nozzle, substantially as specified, 2. The combination of a hopper with a spring plunger, a disk secured thereto, a perforated independently movable head, an adjustable stop, and a cup-shaped weight adapted to embrace the upper end of the plunger, substantially as specified.

3. The combination of a hopper with a plunger, a disk secured thereto, a perforated independently movable head, a discharge tube, a conical nozzle movably secured thereto and a fixed valve adapted to engage said nozzle, substantially as specified.

HERMAN HUEG.

Witnesses:
F. V. BRIESEN,
WILLIAM SCHULZ.